(12) United States Patent
Shin et al.

(10) Patent No.: US 12,464,663 B2
(45) Date of Patent: Nov. 4, 2025

(54) MOVABLE DISPLAY SYSTEM AND METHOD FOR CONTROLLING THE SAME

(71) Applicant: HYUNDAI MOBIS CO., LTD., Seoul (KR)

(72) Inventors: Ji Soo Shin, Yongin-si (KR); Sung Joon Ahn, Seoul (KR); Tae Hun Kim, Suwon-si (KR); Hyun Jun An, Gunpo-si (KR); Shin Jik Lee, Hwaseong-si (KR); Myung Bin Choi, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/585,778

(22) Filed: Feb. 23, 2024

(65) Prior Publication Data
US 2024/0431045 A1 Dec. 26, 2024

(30) Foreign Application Priority Data

Jun. 23, 2023 (KR) .......................... 10-2023-0081355

(51) Int. Cl.
| | |
|---|---|
| *G06F 3/147* | (2006.01) |
| *B60R 11/04* | (2006.01) |
| *G06F 3/01* | (2006.01) |
| *H05K 5/02* | (2006.01) |
| *B60R 11/00* | (2006.01) |

(52) U.S. Cl.
CPC ............ *H05K 5/0217* (2013.01); *B60R 11/04* (2013.01); *G06F 3/013* (2013.01); *B60R 2011/0084* (2013.01); *B60R 2011/0087* (2013.01); *B60R 2011/0092* (2013.01)

(58) Field of Classification Search
CPC ................. H05K 5/0217; B60R 11/04; B60R 2011/0084; B60R 2011/0087; B60R 2011/0092; G06F 3/013
See application file for complete search history.

(56) References Cited

U.S. PATENT DOCUMENTS

| | | | | |
|---|---|---|---|---|
| 2010/0087951 A1* | 4/2010 | Mimura | ............... | G06V 20/593 700/213 |
| 2011/0069435 A1* | 3/2011 | Serizawa | ............ | B60R 11/0235 361/679.01 |

(Continued)

FOREIGN PATENT DOCUMENTS

| | | |
|---|---|---|
| DE | 10 2015 200 233 A1 | 7/2016 |
| EP | 3 670 232 A1 | 6/2020 |
| FR | 3 048 394 A1 | 9/2017 |

OTHER PUBLICATIONS

Extended European search report issued on May 27, 2024, in counterpart European Patent Application No. 24162097.0 (9 pages).

*Primary Examiner* — Christopher E Leiby
(74) *Attorney, Agent, or Firm* — NSIP Law

(57) ABSTRACT

A movable display system and a method therefor are provided. The movable display system includes: a movable display; a driving module to realize at least one of a vertical movement of the movable display, a linear movement of the movable display, a rotational movement of the movable display, or any combination thereof; and a controller to control the driving module such that the movable display functions in a first mode of displaying information outside a mobility and a second mode of displaying information inside the mobility.

18 Claims, 15 Drawing Sheets

(56) References Cited

U.S. PATENT DOCUMENTS

| | | | | |
|---|---|---|---|---|
| 2015/0347075 A1* | 12/2015 | Levesque | ............... | G06F 3/016 |
| | | | | 345/3.1 |
| 2017/0313248 A1* | 11/2017 | Kothari | ................. | B60K 35/10 |
| 2018/0027689 A1* | 1/2018 | Muldowney | ............ | B60R 11/00 |
| | | | | 361/807 |
| 2018/0222490 A1* | 8/2018 | Ishihara | ................ | B60K 35/00 |
| 2018/0264944 A1* | 9/2018 | Torii | ...................... | B60Q 1/268 |
| 2018/0304749 A1* | 10/2018 | Cho | ...................... | B60K 35/10 |
| 2020/0189484 A1* | 6/2020 | Choi | ..................... | B60J 7/0007 |
| 2020/0263395 A1* | 8/2020 | Ohiwa | ................... | E02F 3/435 |
| 2020/0278745 A1* | 9/2020 | Jung | ..................... | G09G 3/001 |
| 2020/0285044 A1 | 9/2020 | Noguchi et al. | | |
| 2020/0391669 A1* | 12/2020 | Fontaeus | ............ | B60R 11/0229 |
| 2022/0049476 A1* | 2/2022 | Kurokami | .............. | B60K 35/00 |
| 2022/0066723 A1* | 3/2022 | Lottes | ................ | B60R 11/0235 |
| 2022/0153134 A1 | 5/2022 | Larry et al. | | |
| 2022/0396205 A1* | 12/2022 | Rodrigues | ................ | B60R 1/23 |
| 2023/0129916 A1* | 4/2023 | Lee | .......................... | B60R 1/25 |
| | | | | 701/36 |
| 2024/0051475 A1* | 2/2024 | Xu | ..................... | B60R 11/0229 |
| 2024/0071334 A1* | 2/2024 | Park | ...................... | F16M 11/10 |

* cited by examiner (A)

(B)

(A)          (B)

(A)  (B)

(A)           (B)

(A)          (B)

(A)

(B)

(C)

(D)

MOVABLE DISPLAY SYSTEM AND METHOD FOR CONTROLLING THE SAME

CROSS-REFERENCE TO RELATED APPLICATION(S)

This application claims the benefit under 35 USC § 119 of Korean Patent Application No. 10-2023-0081355, filed on Jun. 23, 2023, in the Korean Intellectual Property Office, the entire disclosure of which is hereby incorporated by reference for all purposes.

BACKGROUND

1. Field

A following description relates to a movable display system and a method for controlling the same. Specifically, the following description relates to a movable display system and a method for controlling the same for providing a personalized display for each user outside and inside a mobility in an environment where the mobility to which autonomous driving is applied is implemented in a form of a purpose built vehicle (PBV).

2. Description of the Related Art

In general, with a development of a vehicle, convenience structures within the vehicle tend to gradually diversify, and various types of convenience structures are provided for each vehicle depending on respective purposes thereof.

It is great to apply a convenience structure that may meet needs of a vehicle occupant (including a driver, a passenger, and a user) depending on a travel environment or a purpose for each situation, but the existing convenience structure only provides a general structure in a limited form, which is disappointing in terms of convenience.

Additionally, in an environment where a personalized display is provided to the occupant, there is a demand for technology of providing a display both outside and inside the vehicle using a single movable display.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

To solve the problem described above, one aspect of the present disclosure is to provide a purpose built vehicle (PBV) that may provide various convenience structures to an occupant.

Specifically, it is to provide a movable display system and a method for controlling the same that uses a movable display to provide an external display aligned with a gaze of an occupant when the occupant is on board and provide an internal display via a rotational movement of the movable display after the occupant is on board.

In addition, proposed are a structure for efficiently implementing a personalized display via a rotational movement, a left and right movement, and a vertical movement of a single movable display, and a control method based on occupant information.

Problems to be solved in the present disclosure are not limited to the problems mentioned above, and other problems not mentioned will be clearly understood by those skilled in the art to which the present disclosure belongs from a description below.

In a general aspect of the disclosure, a movable display system includes: a movable display; a driving module configured to actuate at least one of a vertical movement of the movable display, a linear movement of the movable display, a rotational movement of the movable display, or any combination thereof; and a controller configured to control the driving module such that the movable display functions in a first mode of displaying information outside a mobility and a second mode of displaying information inside the mobility.

The movable display system may further include: a sensing module configured to identify at least one information among a height and a posture of an occupant, a distance to the occupant, or a combination thereof, wherein the controller may be further configured to control the driving module based on the information obtained by the sensing module.

The sensing module may include a camera configured to obtain at least one information among the height and the posture of the occupant; and a distance sensor configured to determine the distance to the occupant.

The controller may be further configured to control the movable display to move in a vertical direction based on the information obtained by the sensing module during an operation in the first mode to be aligned with a gaze of the occupant.

After the occupant boards the mobility, the controller may be further configured to control the driving module to switch from the first mode to the second mode to allow the movable display to perform the rotational movement.

The sensing module may be mounted on the movable display and configured to perform a rotational movement together with the movable display.

The controller may be further configured to control the driving module based on the information obtained by the sensing module in the second mode to set a location of the movable display.

The driving module may include: a first driving module configured to realize the rotational movement of the movable display; a second driving module configured to realize left and right movement of the movable display; and a third driving module configured to realize the vertical movement of the movable display.

When there are two or more occupants in the mobility, the movable display may be configured to provide a personalized display to each of the two or more occupants.

When the movable display operates in the second mode, the controller may be further configured to: support a second-first mode of providing a display when an occupant is facing forward in the mobility; and support a second-second mode of providing a display when the occupant is facing backward in the mobility.

The linear movement of the movable display may include left and right movement.

In another general embodiment of the disclosure, a method for controlling a movable display within a mobility includes providing an external display to an occupant via at least one of a vertical movement and a left and right movement of the movable display while the occupant is located outside the mobility, and providing an internal display to the occupant by rotating the movable display while the occupant is located inside the mobility.

The method may further include obtaining, by a sensing module, at least one of a height information of the occupant, a posture information of the occupant, a distance information of the occupant, or any combination thereof, wherein the providing of the external display may include providing the external display aligned with a gaze of the occupant based on the information obtained by the sensing module.

The sensing module may be mounted on the movable display, and the rotating of the movable display may include rotating the sensing module.

The providing of the internal display may include setting a location of the movable display based on the information obtained by the sensing module.

The providing of the internal display may include providing a display when the occupant is facing forward in the mobility, and providing a display when the occupant is facing backward in the mobility.

In yet another general aspect of the disclosure, a movable display system for a purpose built vehicle (PBV) includes: a movable display; a sensing module configured to obtain information related to an occupant inside the PBV or a passenger outside the PBV; a driving module configured to actuate at least one of a rotational movement of the movable display, a linear movement of the movable display, a vertical movement of the movable display, or any combination thereof; and a controller configured to control the driving module, based on the information obtained by the sensing module, such that the movable display functions in a first mode of displaying information outside of the PBV, and a second mode of displaying information inside the PBV.

The information obtained by the sensing module may include at least one of a height of the occupant, a posture of the occupant, a distance from the sensing module to the occupant, or any combination thereof.

The sensing module may include at least one of a camera, a distance sensor, or a combination thereof.

The linear movement of the movable display may include left and right movement.

According to the embodiments of the present disclosure as described above, the purpose built vehicle (PBV) that may provide the various convenience structures to the occupant may be implemented.

Specifically, the movable display may be used to provide the external display aligned with the gaze of the occupant when the occupant is on board and provide the internal display via the rotational movement of the movable display after the occupant is on board, thereby providing a personalized display service using the single display.

Effects obtainable from the present disclosure are not limited to the effects mentioned above, and other effects not mentioned will be clearly understood by those skilled in the art to which the present disclosure belongs from a description below.

DETAILED DESCRIPTION

Figure 1:
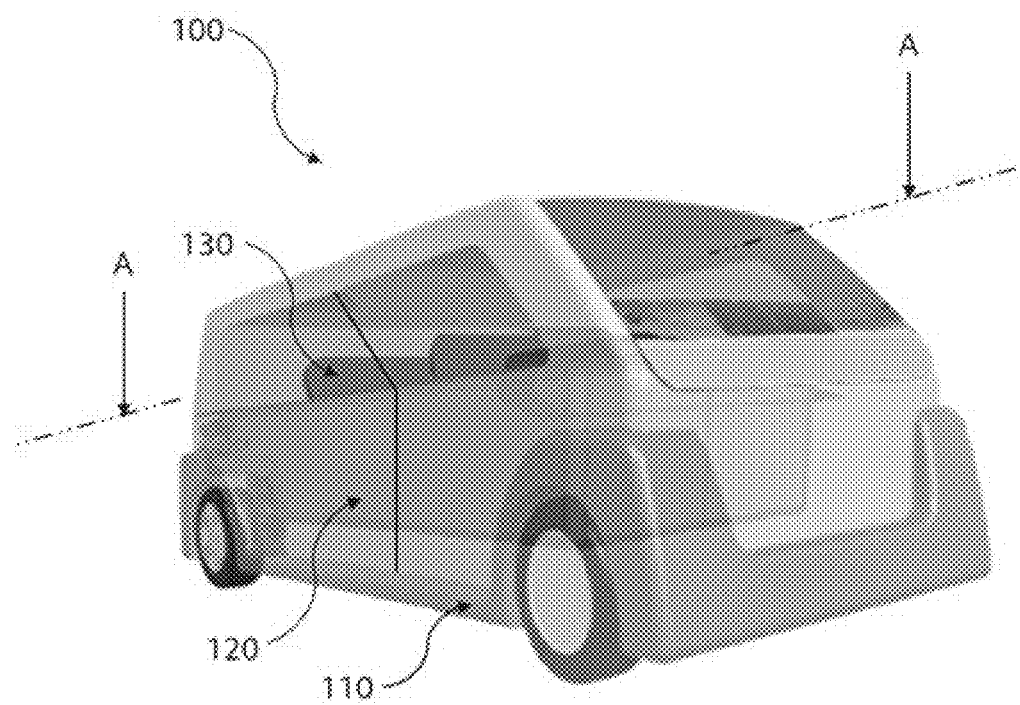
FIG. 1 is a diagram illustrating a PBV according to an embodiment of the present disclosure.

Hereinafter, with reference to the attached drawings, embodiments of the present disclosure will be described in detail such that those skilled in the art may easily practice the same. However, the present disclosure may be implemented in several different forms and may not be limited to the embodiments described herein. To clearly illustrate the present disclosure in the drawings, parts unrelated to the description were omitted, and similar reference numerals were assigned to similar components throughout the present document.

Throughout the present document, when one component "includes" another component, this means that said one component may further include other components rather than excluding the same, unless otherwise specified.

In addition, a 'mobility' used in a following description assumes a vehicle used to transport an occupant, but does not need to be limited thereto and is able to include a bike, an urban air mobility (UAM), a smart mobility, and the like.

As described above, one aspect of the present disclosure is to provide a purpose built vehicle (PBV) that may provide various convenience structures to the occupant.

FIG. 1 is a diagram illustrating a PBV according to an embodiment of the present disclosure.

Referring to FIG. 1, a PBV 100 may include a skateboard 110, a cabin 120, and a seat 130 located within the cabin 120.

The skateboard 110 forms a bottom surface of a vehicle body.

The cabin 120 may be attached to an upper end of the skateboard 110 to provide a boarding space and a separate storage space.

For example, because a vertical level of a bottom surface of the cabin 120 is low, the seat 130 must be adjusted to be located at a high vertical level at which a visibility line is secured to secure visibility from a driver's seat. As a result, the separate storage space may be secured beneath the seat 130 installed in the boarding space of the cabin 120.

Figure 2:
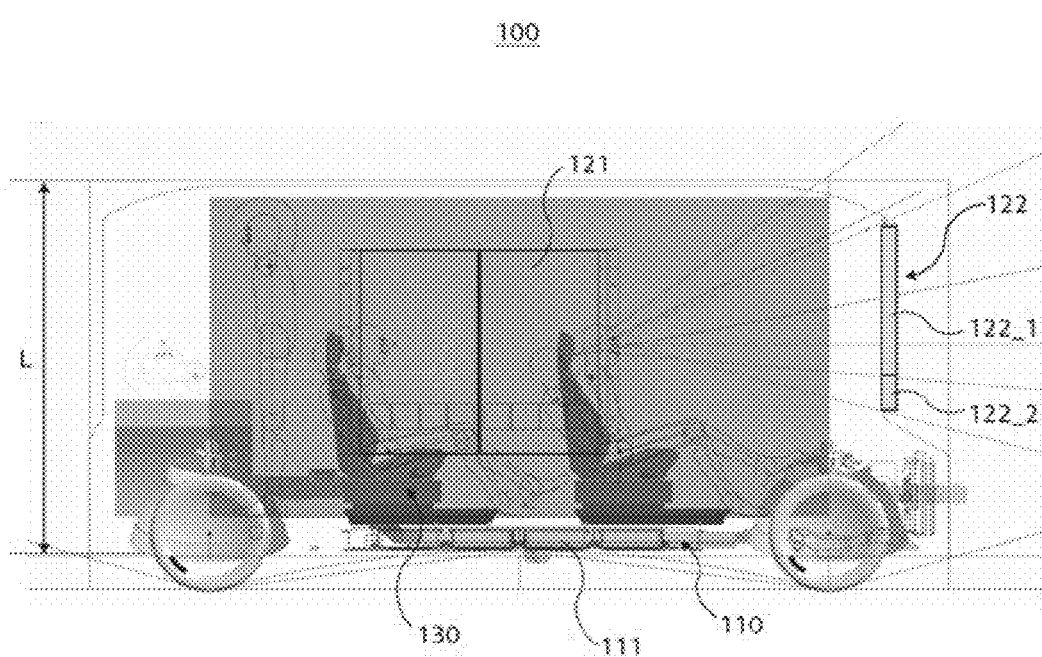
FIG. 2 is a side cross-sectional view showing a cross-section taken along a line A-A indicated in FIG. 1.

FIG. 2 is a side cross-sectional view showing a cross-section taken along a line A-A indicated in FIG. 1.

Referring to FIG. 2, a battery mounting space 111 may be defined in the skateboard 110. The battery mounting space 111 is preferably designed in consideration of installation of a battery (not shown) and a control precision.

It is preferable for the cabin 120 to have the seat 130 that may not only be reclined, but also rotate by itself, for convenience of the occupant. In particular, an overall height L of the cabin 120 may be designed to be a height for the occupant to stand comfortably.

In this regard, the overall height L of the cabin 120 may be adjusted under separate control.

A side display 121 installed in the cabin 120 may transmit an entertainment screen for infotainment and other information images to a screen.

A windshield 122 may have a display form that optionally displays the image to the inside and outside of the vehicle.

The windshield 122 may include an electrochromic image area 122_1 and an opaque image area 122_2.

The electrochromic image area 122_1 may adjust shading such that the image is optionally displayed to the inside or outside of the vehicle depending on power supply.

The opaque image area 122_2 may extend to a lower end or an upper end of the electrochromic image area 122_1.

As another example, the windshield 122 may be applied in a manner of being divided into an internal display area and an external display area.

For example, the internal display area may display the image toward the inside of the vehicle, and the external display area may display the image toward the outside of the vehicle. In this regard, the internal and external display areas may have separate electricity application paths.

Hereinafter, a movable display system and a method for controlling the same that uses a movable display to provide an external display aligned with a gaze of the occupant when the occupant is on board and provide an internal display via a rotational movement of the movable display after the occupant is on board will be described. such movable display system and the method for controlling the same are assumed to be applied to the above-described PBV environment, but are not limited thereto and are able to be applied to a general mobility to which autonomous driving is not applied to provide a personalized display environment.

Figure 3:
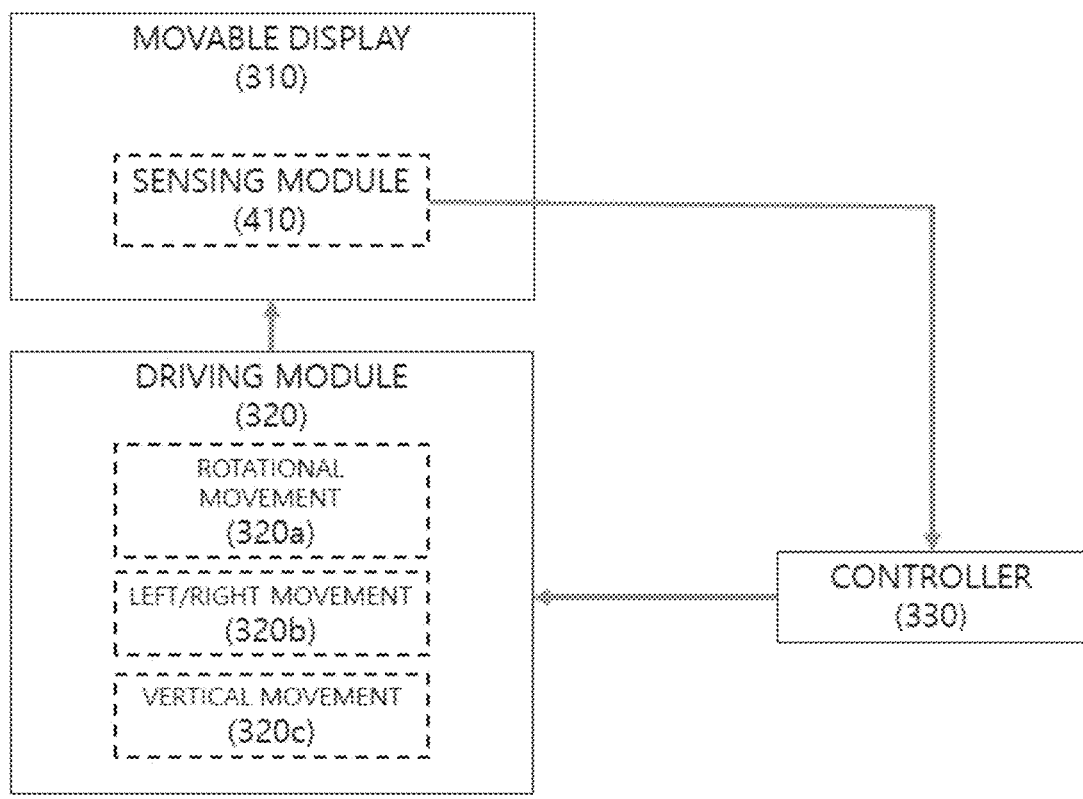
FIG. 3 is a diagram for illustrating a configuration of a movable display system according to an embodiment of the present disclosure.

FIG. 3 is a diagram for illustrating a configuration of a movable display system according to an embodiment of the present disclosure.

The movable display system shown in FIG. 3 may include a movable display 310; a driving module 320 that realizes at least one of a vertical movement, a left and right movement, and a rotational movement of the movable display 310; and a controller 330 that controls the driving module 320 for the movable display 310 to function in a first mode of displaying information outside the mobility and a second mode of displaying information inside the mobility. The controller 330 may include a processor and a non-transitory memory storing a program executable by the processor.

Preferably, the movable display system in FIG. 3 may additionally include a sensing module 410 that obtains at least one information among a height and a posture of the occupant and a distance to the occupant.

As such, the above-described information obtained by the sensing module 410 may be transmitted to the controller 330, and the controller 330 may control the driving module 320 based on the information.

As illustrated in FIG. 3, the driving module 320 may include a first driving module 320a that realizes the rotational movement of the movable display 310, a second driving module 320b that realizes a linear movement of the movable display 310, and a third driving module 320c that realizes the vertical movement of the movable display 310, and specific structures and operating schemes thereof will be described below.

Figure 4:
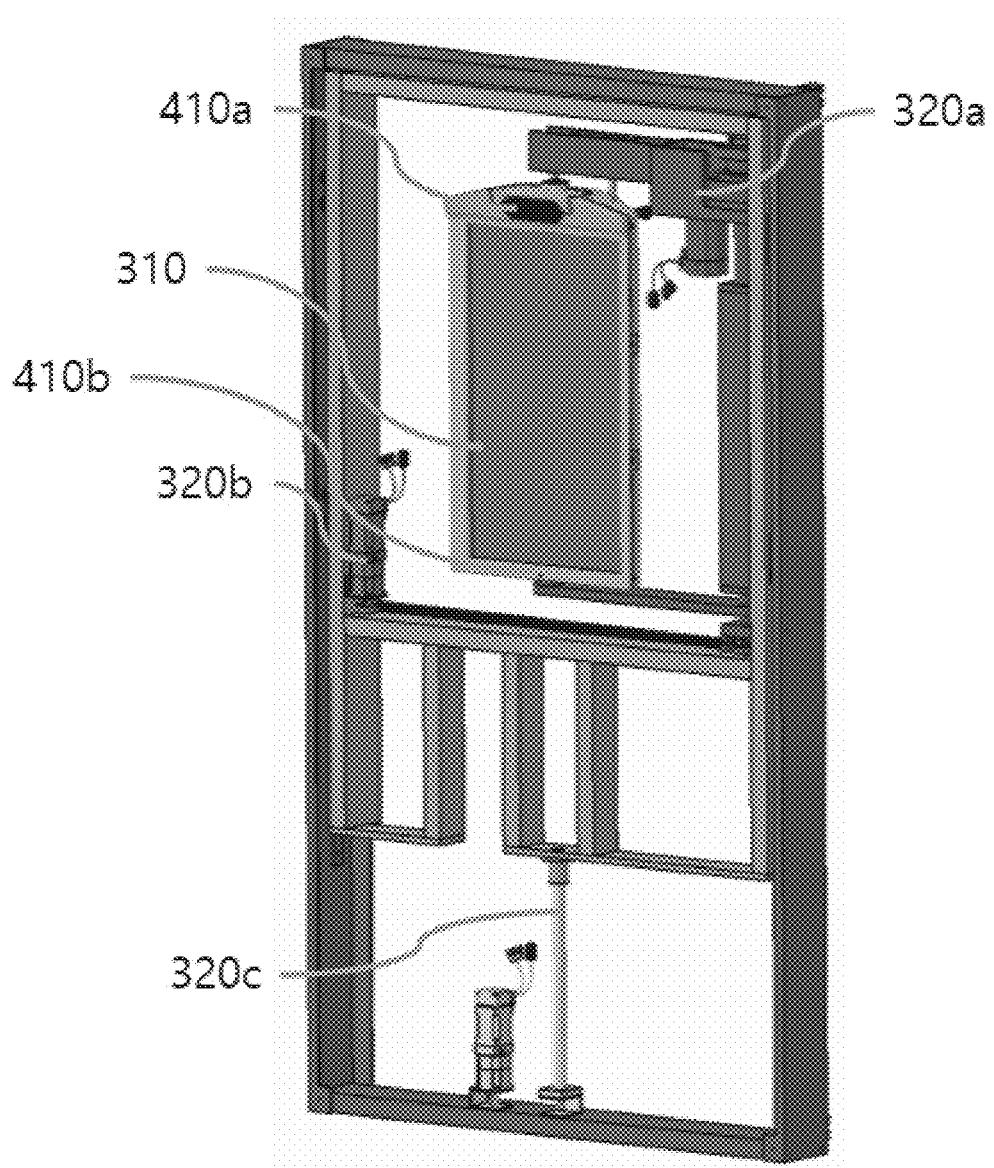
FIGS. 4 and 5 are diagrams for illustrating a structure and an operating scheme of a movable display system according to an embodiment of the present disclosure.
Figure 5:
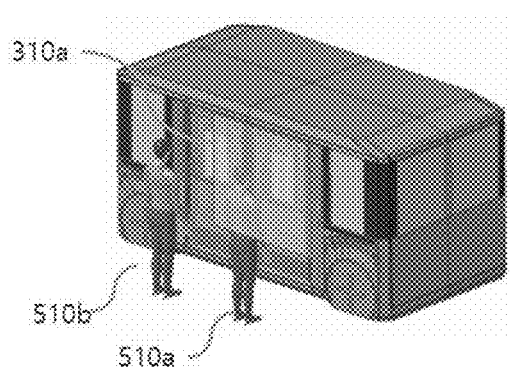
Figure 5:
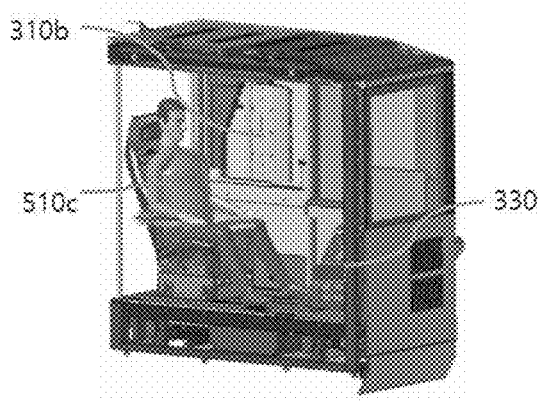

FIGS. 4 and 5 are diagrams for illustrating a structure and an operating scheme of a movable display system according to an embodiment of the present disclosure.

As described above, the movable display 310 may provide a personalized display function outside ((A) in FIG. 5) and inside ((B) in FIG. 5) the mobility under the control of the controller (not shown) by the first driving module 320a that realizes the rotational movement, the second driving module 320b that realizes the linear movement, and the third driving module 320c that realizes the vertical movement.

In the embodiment shown in FIGS. 4 and 5, the sensing module 410 may include a camera 410a for obtaining at least one information among heights and postures of occupants 510a, 510b, and 510c, and a distance sensor 410b for determining distances to the occupants 510a, 510b, and 510c.

Under such structure, the controller 330 may control a movable display 310a to move vertically based on the occupant information (e.g., the height) obtained by the sensing module 410, specifically, the camera 410a, during operation of the first mode in which the movable display 310a provides the display outside the mobility, to be aligned with a gaze of the occupant 510a, as shown in (A) in FIG. 5.

In addition, the sensing module 410 equipped with the camera 410a and/or the distance sensor 410b may determine locations of the occupants 510a and 510b and assist with a left and right movement of the movable display 310a as shown in (A) in FIG. 5.

In one example, as shown in (B) in FIG. 5, after the occupant 510c boards the mobility, for the movable display 310 to switch from the first mode (an external display mode) to the second mode (an internal display mode), the controller 330 may control the driving module 320, specifically, the first driving module 320a for the rotational movement in the driving module 320, to allow a movable display 310b to perform the rotational movement Even after the occupant 510c boards the mobility vehicle, it is preferable for the sensing module 410 to obtain information on the occupant 510c and provide a display that is aligned with a gaze of the occupant 510c. For this purpose, a separate sensing module (not shown) for the second mode (the internal display mode) may also be included. In a preferred embodiment of the present disclosure, it is proposed that the sensing module 410 is mounted on the movable display 310 and performs the rotational movement together with the movable display 310.

The controller 330 may set a location of the movable display 310b by controlling the driving module 320 based on the information obtained by the sensing module 410 in such second mode (the internal display mode).

Figure 6:
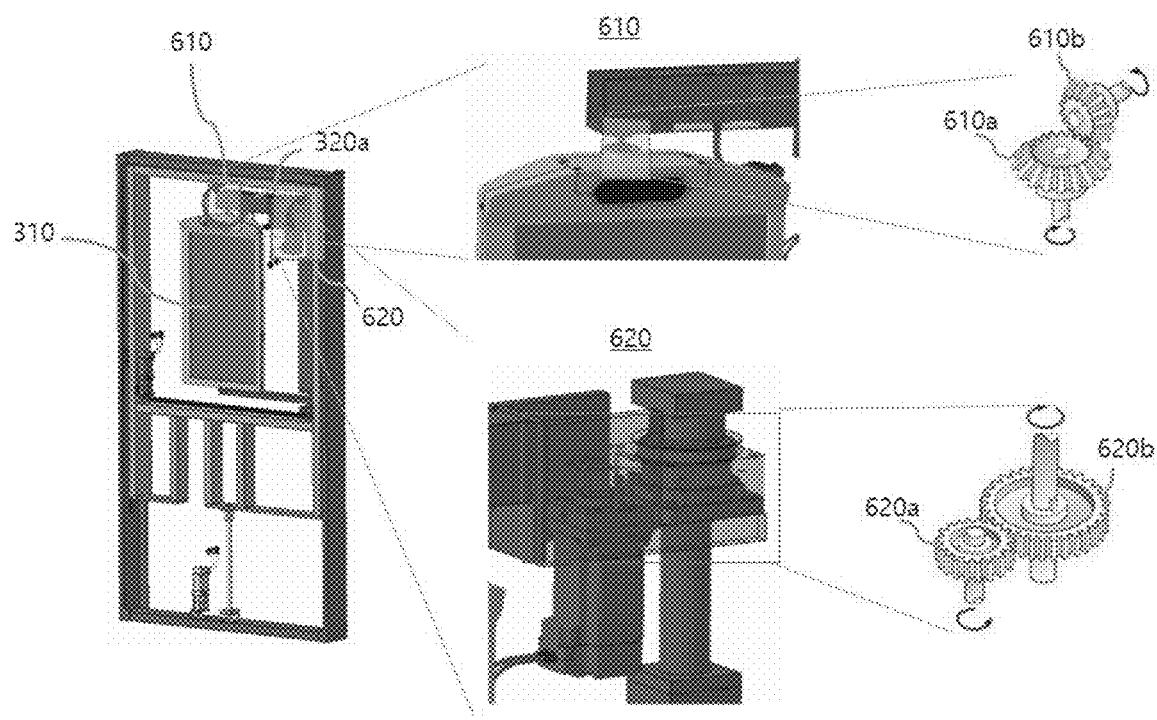
FIG. 6 is a diagram for illustrating an operating principle of a first driving module according to an embodiment of the present disclosure.

FIG. 6 is a diagram for illustrating an operating principle of a first driving module according to an embodiment of the present disclosure.

As described above, the first driving module 320a may be implemented to operate in the first mode (the external display mode) and the second mode (the internal display mode) via the rotation of the movable display 310. To this end, as shown in FIG. 6, the first driving module 320a may include a first rotating portion 610 that rotates the movable display 310 in an arm that fixes the movable display 310, and a second rotating portion 620 that realizes rotation of the arm itself that fixes the movable display 310.

As shown at the top of FIG. 6, the first rotating portion 610 may be driven to rotate the movable display 310 while fixed to the arm via rotation of a first gear 610a formed in a vertical direction on top of the movable display 310 and a second gear 610b fastened in a direction perpendicular to the first gear 610a.

In one example, the second rotating portion 620 is a component for rotating the arm itself that fixes the movable display 310, as shown at the bottom of FIG. 6, and is able to realize the rotational movement of the arm via rotation of a third gear 620a and a fourth gear 620b connected in parallel with each other. The rotational movement of the arm itself via the second rotating portion 620 may be controlled such that the movable display 310 is positioned in a direction of a gaze of an occupant when the occupant sits on the inner seat.

The example of FIG. 6 shows that degrees of freedom are secured by implementing the first driving module 320a to enable the rotational movement in two portions for the rotational movement of the movable display 310. However, in a relationship between an increase in the degree of freedom and complexity of the configuration, a one-portion rotational movement and a three-portion rotational movement are also possible.

Figure 7:
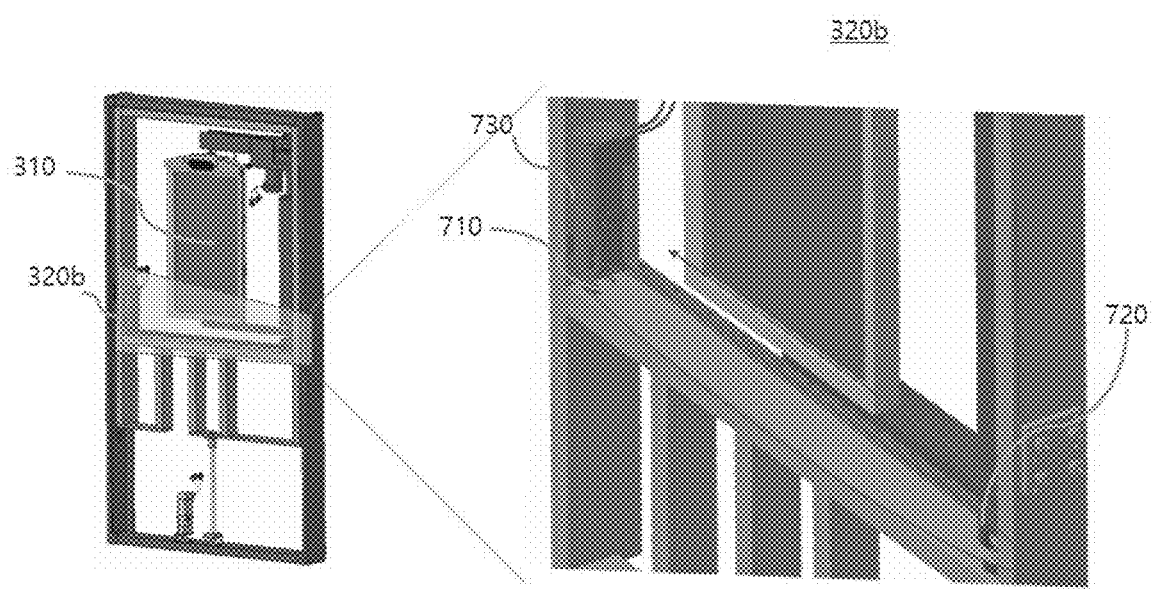
FIG. 7 is a diagram for illustrating an operating principle of a second driving module according to an embodiment of the present disclosure.

FIG. 7 is a diagram for illustrating an operating principle of a second driving module according to an embodiment of the present disclosure.

The second driving module 320b is a component for realizing the left and right movement of the movable display 310 as shown in FIG. 7. The second driving module 320b may include an actuator 730 that provides a driving force for the linear movement, and a rail 710 that guides the left and right movement of the movable display 310. and a fastener 720 that fastens the arm supporting the movable display 310 to move on the rail 710.

The second driving module 320b may realize the left and right movement of the movable display 310 to match the location of the occupant obtained by the sensing module 410, as shown in (A) in FIG. 5. The second driving module 320b may realize the left and right movement of the movable display 310 even when the occupant is inside the mobility, as will be described later with reference to FIGS. 10 to 12.

Figure 8:
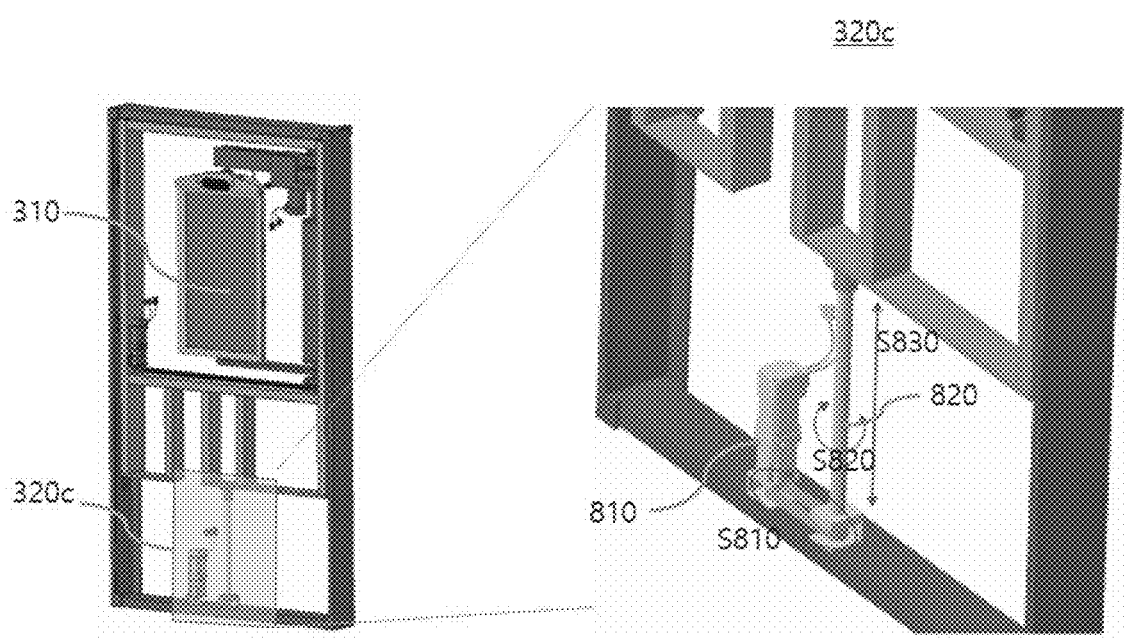
FIG. 8 is a diagram for illustrating an operating principle of a third driving module according to an embodiment of the present disclosure.

FIG. 8 is a diagram for illustrating an operating principle of a third driving module according to an embodiment of the present disclosure.

The third driving module 320c is a component for realizing the vertical movement of the movable display 310 as described above, and is able to be located at the lower portion of the mobility as shown in FIG. 8.

Specifically, the third driving module 320c may use a rotational force (S810) of a connecting member by driving an actuator 810, which allows a shaft 820 to rotate (S820) to realize a vertical movement (S830) of a frame at a portion of connection with the frame supporting the movable display 310.

Figure 9:
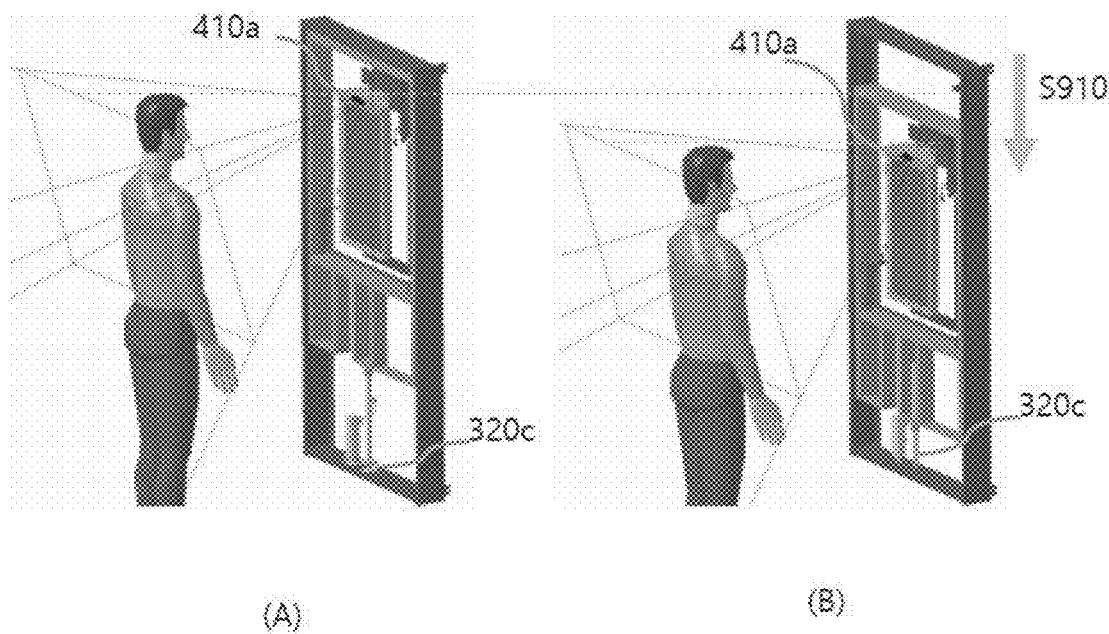
FIG. 9 is a diagram for illustrating an operating scheme of a vertical movement of a movable display in a first mode according to an embodiment of the present disclosure.

FIG. 9 is a diagram for illustrating an operating scheme of a vertical movement of a movable display in a first mode according to an embodiment of the present disclosure.

FIG. 9 shows an example of controlling the vertical movement of the movable display 310 based on the height of the occupant via an image of the camera 410a.

When the movable display 310 at a location shown in (A) in FIG. 9 does not match the height of the occupant when checked via the image of the camera 410a, the third driving module 320c as shown in (B) in FIG. 9 may be operated to lower a vertical level of the movable display 310 to match the height of the occupant.

Figure 10:
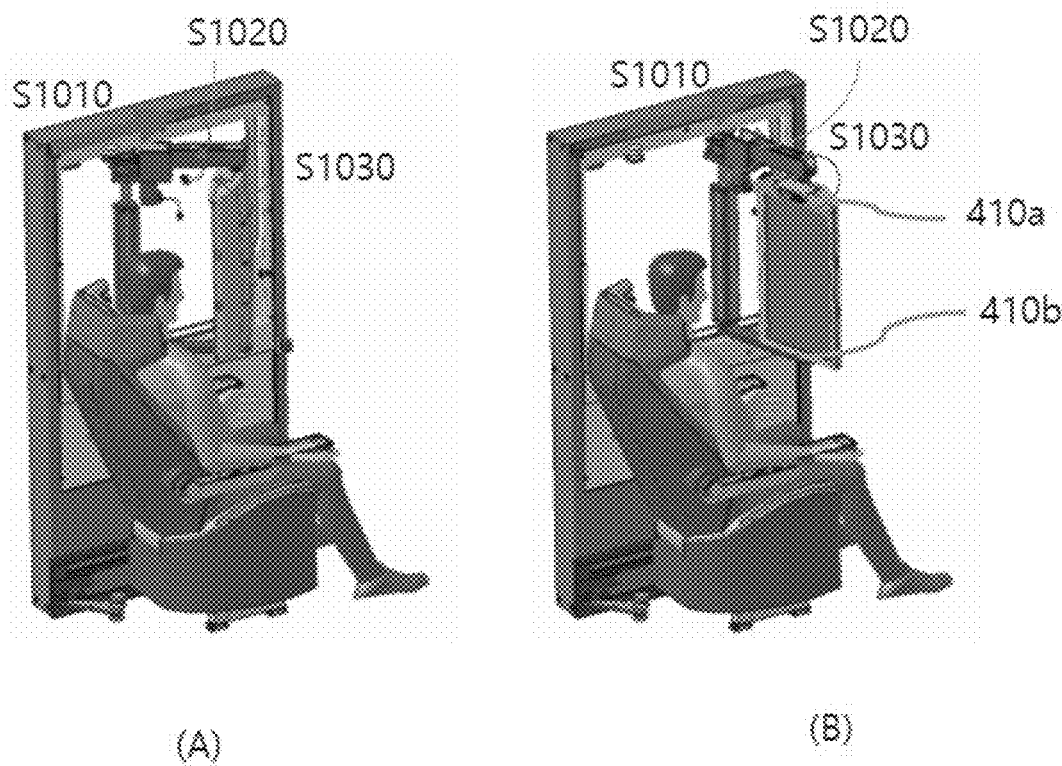
FIGS. 10 to 12 are diagrams for illustrating operating schemes of rotational/vertical/left and right movements of a movable display in a second mode according to an embodiment of the present disclosure.
Figure 11:
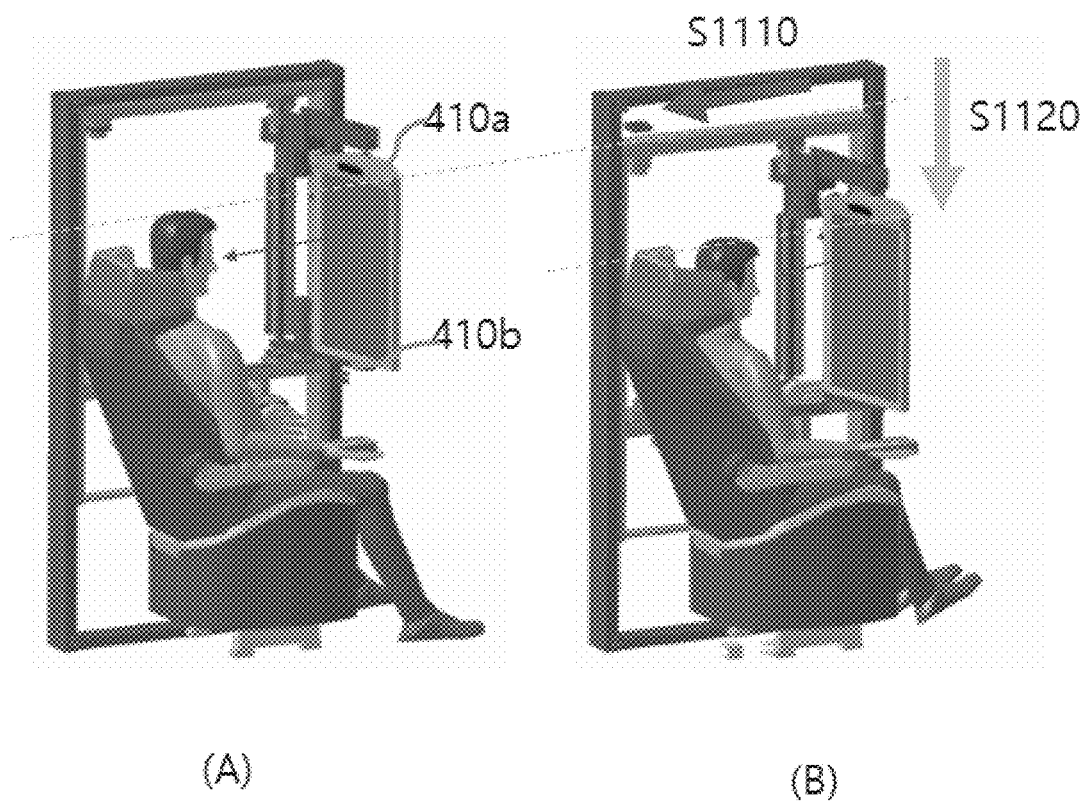
Figure 12:
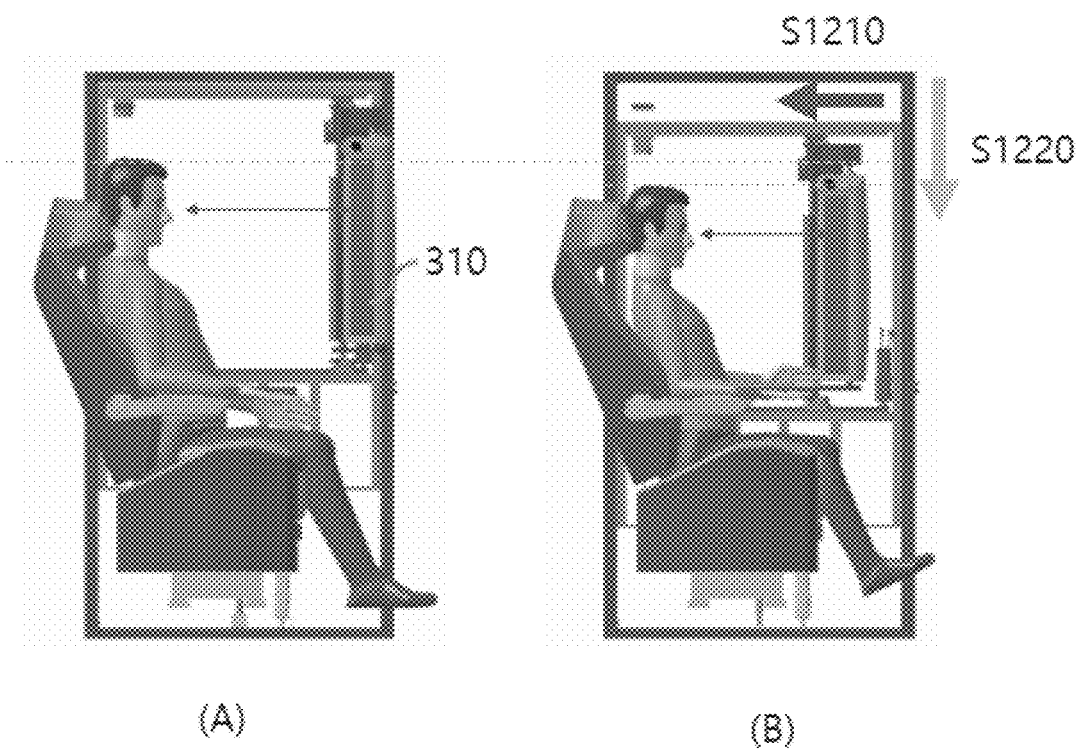

FIGS. 10 to 12 are diagrams for illustrating operating schemes of rotational/vertical/left and right movements of a movable display in a second mode according to an embodiment of the present disclosure.

First, referring to FIG. 10, when the occupant has completed the boarding, the movable display may be moved left and right via the second driving module (S1010). Thereafter, or at the same time, the rotational movement of the movable display may be realized via the first driving module, and the rotational movement may be performed by being divided into rotation (S1020) of the movable display support arm using the second rotating portion and rotation (S1030) of the display itself using the first rotating portion, as described above with reference to FIG. 6.

In one example, degrees of the left and right movement (S1010) and the rotational movements (S1020 and S1030) described above may be set based on the information on the location, the height, and the posture of the occupant identified via the camera 410a and the distance sensor 410b. In an example in FIG. 10, it is proposed that the camera 410a and/or the distance sensor 410b perform the rotational movement together with the movable display and operate in the same manner in the second mode (the internal display mode).

Referring to FIG. 11, an example of realizing additional left and right movement (S1110) and vertical movement (S1120) of the movable display based on the information from the camera 410a and/or the distance sensor 410b is shown. That is, the third driving module described above with reference to FIG. 8 may be used for the vertical movement (S1120) of the movable display in the same manner in the second mode (the internal display mode).

Referring to FIG. 12, in the second mode (the internal display mode), the location of the movable display 310 may be set based on needs of the occupant as well as the height of the occupant and the distance to the occupant. For example, when it is necessary for the occupant to control a display content of the movable display 310 in a touch scheme, the movable display 310 may be manipulated to get to a location where manipulation using a hand of the occupant is easy (S1210) and additionally move downward (S1220).

Such location control of the movable display 310 may be provided by forming a manipulation unit (not shown) on an armrest of the seat of the occupant, in a voice recognition scheme, or in a screen touch scheme.

Figure 13:
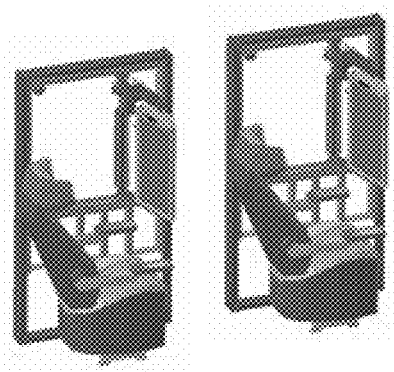
FIGS. 13 and 14 are diagrams for illustrating scenarios when multiple occupants exist according to an embodiment of the present disclosure.
Figure 13:
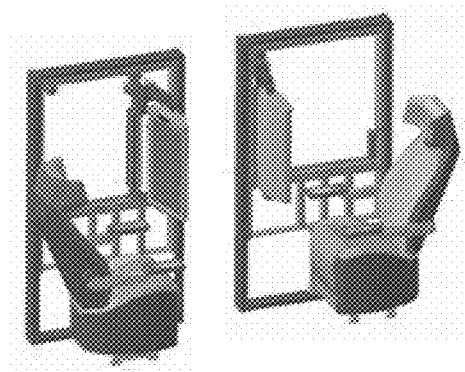
Figure 13:
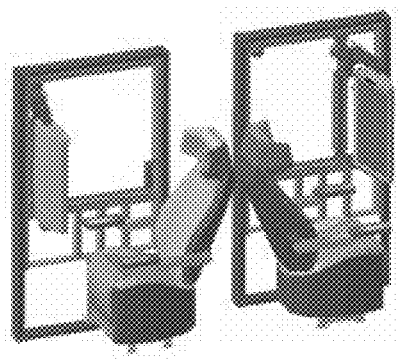
Figure 13:
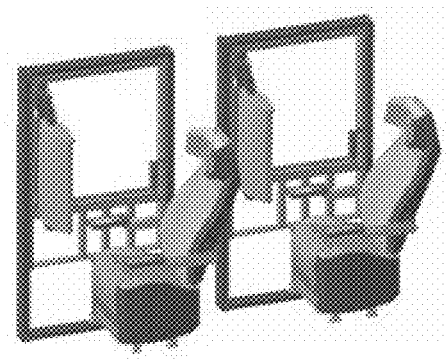
Figure 14:

FIGS. 13 and 14 are diagrams for illustrating scenarios when multiple occupants exist according to an embodiment of the present disclosure.

As described above with reference to FIGS. 1 and 2, the mobility of the present embodiment may be the PBV, and the above-described movable display system may be implemented to provide the personalized display to each of the multiple occupants. For example, the personalized display may display guidance information on a surrounding environment to the mobility vulnerable, such as the hearing impaired, and may also display information to provide instructions for safety when boarding and disembarking to the elderly and children.

In this case, the movable display and the driving module for the rotational movement, the left and right movement, and the vertical movement of the movable display may be provided to each of the multiple occupants, but the controller may be commonly implemented.

(A) in FIG. 13 shows a concept of providing the personalized display with the occupants respectively directed in a forward direction+the forward direction from the side of the PBV, (B) in FIG. 13 shows a case in which the occupants are respectively directed in the forward direction+a reverse direction, (C) in FIG. 13 shows a case in which the occupants are respectively directed in the reverse direction+the forward direction, and (D) in FIG. 13 shows a case in which the occupants are respectively directed in the reverse direction+the reverse direction.

In addition, 1210 in FIG. 14 indicates a case in which all occupants are directed in the forward/reverse direction, 1220 indicates a case in which only one seat is directed in the reverse direction, 1230 indicates a case in which two seats are directed in the reverse direction, and 1240 indicates a case in which three seats are directed in the reverse direction.

As shown in FIGS. 13 and 14, to provide the forward/reverse display to each of the plurality of occupants, the above-mentioned movable display system needs to be disposed for each occupant, and spatial arrangement for the rotational/left and right/vertical movements may be required.

Figure 15:
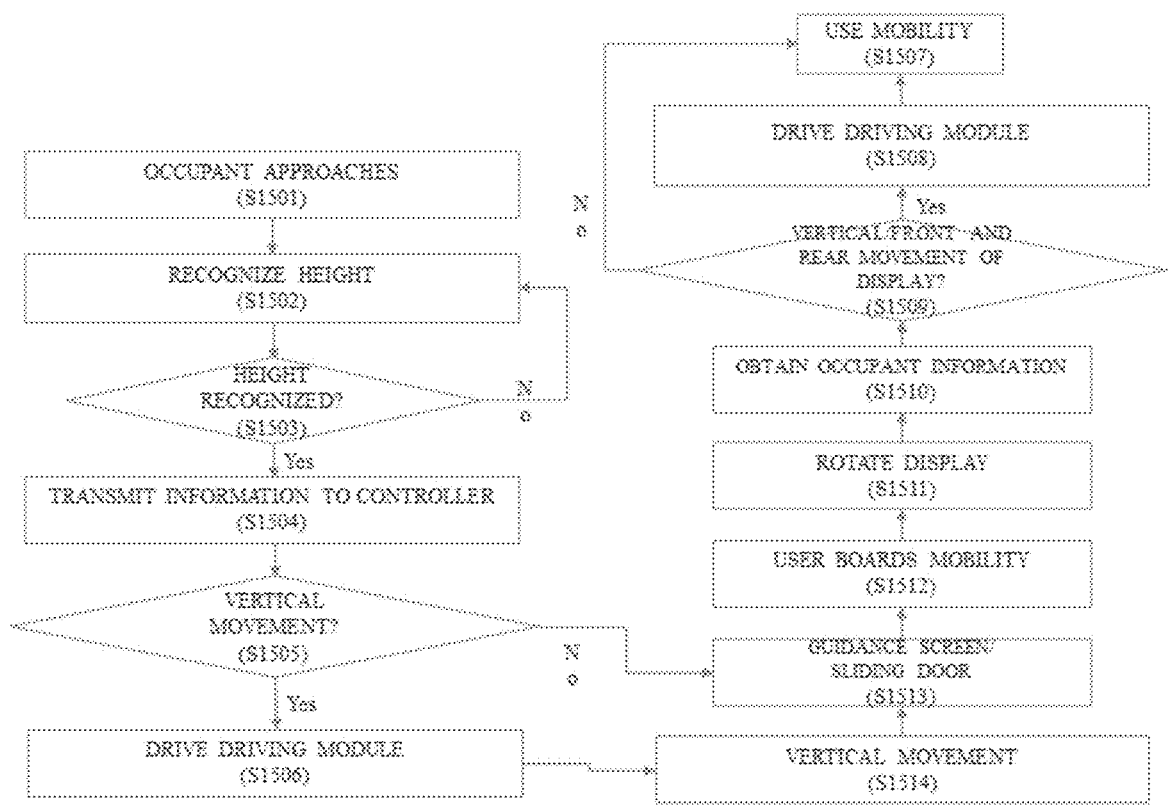
FIG. 15 is a diagram illustrating various scenarios for controlling a movable display system according to an embodiment of the present disclosure.

FIG. 15 is a diagram illustrating various scenarios for controlling a movable display system according to an embodiment of the present disclosure.

In an example in FIG. 15, first, when the occupant approaches the mobility (S1501), the corresponding occupant may register a profile and personal information thereof via a user app and approaches the corresponding mobility in a state in which a seat direction is input.

In this case, the mobility may recognize a height of the occupant via the camera as described above (S1502). When the height recognition is successful (S1503), information of the corresponding occupant may be transmitted to the controller (S1504), and the controller may determine whether the vertical movement of the movable display is necessary based on image information of the occupant (S1505).

When the vertical movement of the movable display is necessary, the driving module (the third driving module 320c in FIG. 8) for the vertical movement of the movable display may be driven to adjust the vertical level of the movable display to match the height of the occupant (S1514).

As described above, when the vertical movement is completed (S1514), or when the vertical movement is unnecessary, the movable display may transmit a guidance screen for authentication of the corresponding occupant. When the authentication of the corresponding occupant is completed, a sliding door may open (S1513), and the seat may be adjusted in the direction input by the corresponding occupant.

When the occupant boards the mobility via the above-described procedures (S1512), the movable display may perform the rotational movement by the driving module (e.g., the first driving module 320a in FIG. 6) (S1511).

It is efficient for the sensing module to rotate along with the rotation of the movable display. The information (e.g., a sitting height, the posture, the distance, and the like) of the occupant seated in the seat may be obtained via the sensing module that has completed the rotational movement (S1510). Based on such information, whether additional vertical/front and back movements of the display are necessary may be identified (S1509). When necessary, the movements as shown in FIGS. 10 to 12 may be performed by driving the driving module (S1508).

The occupant may use the mobility while the internal display is provided via the adjustment of the movable display as described above (S1507).

The detailed description of the preferred embodiments of the present disclosure disclosed as described above is provided to enable those skilled in the art to implement and practice the present disclosure. Although the description has been made with reference to the preferred embodiments of the present disclosure, those skilled in the art will understand that the present disclosure may be modified and changed in various ways without departing from the scope of the present disclosure. For example, a person skilled in the art may use each of the components described in the above-described embodiments in a manner of combining the components with each other.

Accordingly, the present disclosure is not intended to be limited to the embodiments described herein, but is to be accorded the widest scope consistent with the principles and novel features disclosed herein.

INDUSTRIAL APPLICABILITY

The movable display system and the method for controlling the same according to the embodiments of the present disclosure as described above may be utilized in a variety of ways of providing a personalized display service while increasing convenience of an occupant not only in an autonomous vehicle but also in a general vehicle.

What is claimed is:

1. A movable display system for a mobility, the movable display system comprising:
   a movable display;
   a driving module configured to actuate at least one of a vertical movement of the movable display, a left and right movement of the movable display, and a rotational movement of the movable display;
   a sensor configured to detect an occupant inside the mobility; and
   a controller configured to control the driving module to move the movable display into position such that the movable display functions in:
      a first mode of displaying information on the movable display such that the displayed information is visible outside of the mobility; and
      a second mode of displaying information on the movable display such that the displayed information is visible inside of the mobility,
   wherein, in the second mode, the controller is further configured to move the movable display to face the occupant's front view based on the detection of the occupant by the sensor.

2. The movable display system of claim 1,
   wherein the sensor includes a sensing module configured to identify at least one information among a height and a posture of the occupant, a distance to the occupant, or a combination thereof, and
   wherein the controller is further configured to control the driving module based on the information obtained by the sensing module.

3. The movable display system of claim 2, wherein the sensing module comprises:
   a camera configured to obtain at least one information among the height and the posture of the occupant; and
   a distance sensor configured to determine the distance to the occupant.

4. The movable display system of claim 2, wherein the controller is further configured to control the movable display to move in a vertical direction based on the information obtained by the sensing module during an operation in the first mode to be aligned with a gaze of the occupant.

5. The movable display system of claim 2, wherein, after the occupant boards the mobility, the controller is further configured to control the driving module to switch from the first mode to the second mode to allow the movable display to perform the rotational movement.

6. The movable display system of claim 5, wherein the sensing module is mounted on the movable display and configured to perform a rotational movement together with the movable display.

7. The movable display system of claim 6, wherein the controller is further configured to control the driving module based on the information obtained by the sensing module in the second mode to set a location of the movable display.

8. The movable display system of claim 1, wherein the driving module includes:
   a first driving module configured to realize the rotational movement of the movable display;
   a second driving module configured to realize left and right movement of the movable display; and
   a third driving module configured to realize the vertical movement of the movable display.

9. The movable display system of claim 1, wherein when there are two or more occupants in the mobility, the movable display is configured to provide a personalized display to each of the two or more occupants.

10. The movable display system of claim 1, wherein when the movable display operates in the second mode, the controller is further configured to:
   support a second-first mode of providing a display when the occupant is facing forward in the mobility; and
   support a second-second mode of providing a display when the occupant is facing backward in the mobility.

11. A method for controlling a movable display within a mobility, the method comprising:
   detecting, by the mobility, an occupant inside the mobility;
   controlling movement of the movable display to move in at least one of a vertical movement and a left and right movement to provide an external display that is visible outside the mobility; and
   controlling movement of the movable display to move in at least one of the vertical movement and the left and right movement to provide an internal display to face the occupant's front view based on the detection of the occupant.

12. The method of claim 11, further comprising:
   obtaining, by a sensing module, at least one of a height information of the occupant, a posture information of the occupant, a distance information of the occupant, or any combination thereof,
   wherein the providing of the external display includes providing the external display aligned with a gaze of the occupant based on the information obtained by the sensing module.

13. The method of claim 12,
   wherein the sensing module is mounted on the movable display, and
   wherein the rotating of the movable display includes rotating the sensing module.

14. The method of claim 13, wherein the providing of the internal display includes setting a location of the movable display based on the information obtained by the sensing module.

15. The method of claim 11, wherein the providing of the internal display includes:
   providing a display when the occupant is facing forward in the mobility; and
   providing a display when the occupant is facing backward in the mobility.

16. A movable display system for a purpose built vehicle (PBV), the system comprising:
   a movable display;
   a sensing module configured to obtain information related to an occupant inside the PBV and a passenger outside the PBV;
   a driving module configured to actuate at least one of a rotational movement of the movable display, a left and right movement of the movable display, and a vertical movement of the movable display; and
   a controller configured to control the driving module such that the movable display functions in:
      a first mode of displaying information outside of the PBV based on the information of the passenger outside the PBV obtained by the sensing module; and
      a second mode of displaying information inside the PBV based on the information of the occupant inside the PBV obtained by the sensing module,
   wherein, in the second mode, the controller is further configured to move the movable display to face the occupant's front view based on the detection of the occupant by the sensing module.

17. The system of claim 16, wherein the information obtained by the sensing module comprises at least one of a height of the occupant, a posture of the occupant, a distance from the sensing module to the occupant, or any combination thereof.

18. The system of claim 16, wherein the sensing module comprises at least one of a camera, a distance sensor, or a combination thereof.

* * * * *